Oct. 10, 1939.                 H. E. METCALF                    2,175,848
                         VEHICLE SIGNALING SYSTEM
                            Filed March 19, 1938
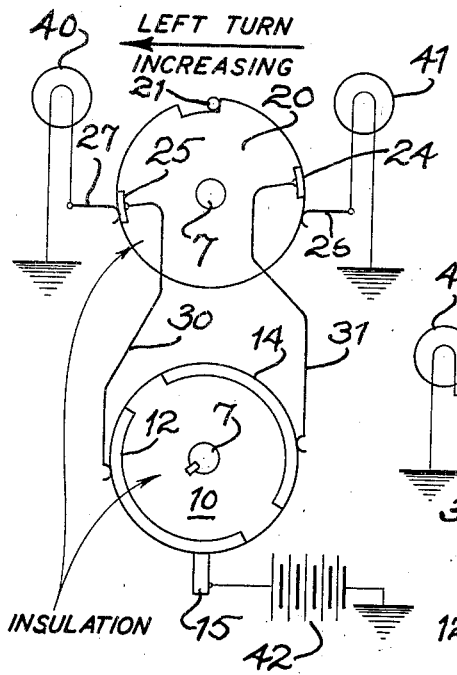
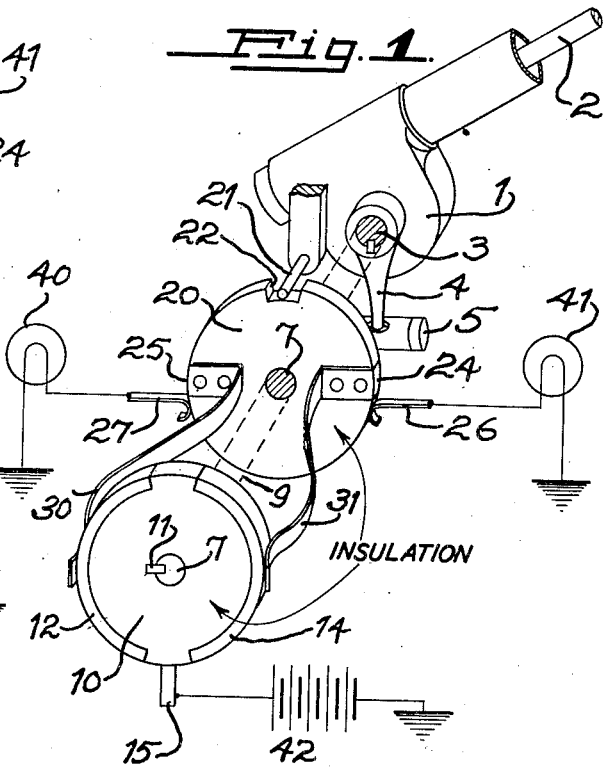
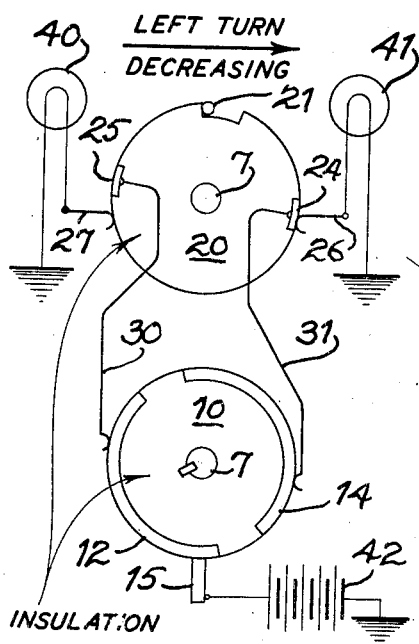
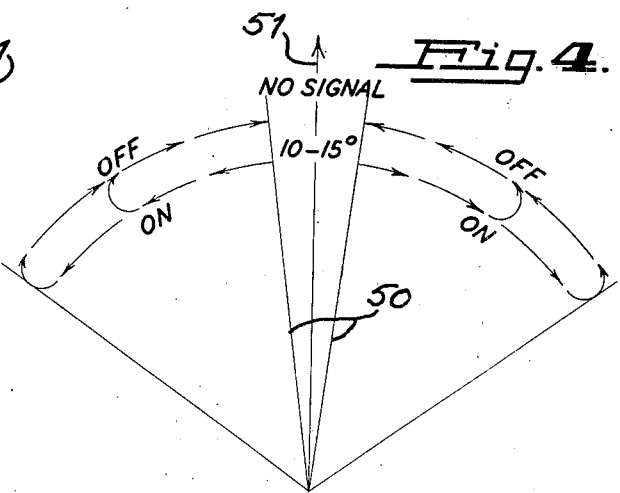
INVENTOR.
HERBERT E. METCALF.
BY Lippincott & Metcalf
ATTORNEYS.

Patented Oct. 10, 1939

2,175,848

UNITED STATES PATENT OFFICE 2,175,848

VEHICLE SIGNALING SYSTEM

Herbert E. Metcalf, Walnut Creek, Calif., assignor to E. H. Kueffer, Oakland, Calif.

Application March 19, 1938, Serial No. 196,813

5 Claims. (Cl. 177—339)

My invention relates to automatic vehicle signaling systems, and more particularly to a system utilizing an automatic switch turning in synchronism with the steering gear of an automotive vehicle to selectively energize right and left indicators from a power source.

In the prior art, many vehicle signaling systems have been utilized wherein an automatic switch has been attached to the steering mechanism of a vehicle, this switch operating in accordance with the turning of the steering mechanism to energize a vehicle signal, such as a lamp or an arm, whenever the vehicle turns away from a straight-away course. Irrespective of the detailed construction, practically all of these switches employ means for closing a left hand signaling circuit when the vehicle is turned away from a straight-away course toward the left, and the left hand signal remains energized until the vehicle returns to the straight-ahead course. In a like manner, the right hand signaling circuit is energized and a signal given whenever the vehicle is turned from the straight-ahead course to the right, and this signal is maintained until the vehicle returns to a straight-ahead course.

The usual structure of such a switch comprises a disc rotated by the steering mechanism, this disc having a central common brush connected to the battery of the vehicle, and two lateral brushes. Conductive segments are placed on the disc in such a position that no current passes through the switch when the vehicle is on a straight-away course, but when the vehicle is making a turn the disc is turned, so that one or the other of the conductive segments or sectors connects the central brush with one or the other of the lateral brushes. Signaling circuits connected to the lateral brushes are thus energized. This type of switch, or its equivalent, I prefer to call a sector type switch.

All sector type switches have a common fault, namely, that they give a false signal after a turn has been made and while the reverse turn is being made to reach the straight-away course again. In other words, when the steering gear is turned to make a left hand turn, for example, the left hand light will be on. When the turn of the vehicle is reversed, however, to straighten out the vehicle, the left hand light is still on. Actually, as far as relative courses of the vehicle are concerned, the vehicle is actually making a right hand turn on the left of the straight-away course while the left hand light is on. Consequently, a following vehicle, seeing the left hand light on, may conclude that a left hand turn is to be maintained, or is to be increased, where actually the driver of the forward vehicle is in reality decreasing the left hand turn toward the straight-away condition. Thus, a false signal is given.

The present invention is directed toward an automatic switch wherein a signal is automatically given only so long as a turn away from the straight-away is being increased or maintained, this switch having means for automatically removing all indication whenever the angle of turn is decreased or reversed on the way back to a straight-away path. Thus, a following vehicle is immediately notified that the left hand turn is finished and that the driver of the forward vehicle is returning to the straight-away position. Tests have proved that the removal of all indication on a decreasing turn is a great advantage to the following vehicle, in that the driver thereof is not falsely advised that the forward car is still making a left hand turn when actually it is turning back toward the straight-away.

The main object of my invention, therefore, is to provide a simple and efficient automatic switch for use in conjunction with a vehicle direction indicator system, whereby signals will be given as long as turns are increased or maintained, but no signal will be given whenever any turn is decreased.

Other objects of my invention will be apparent or will be specifically pointed out in the description forming a part of this specification, but I do not limit myself to the embodiment of the invention herein described, as various forms may be adopted within the scope of the claims.

Other objects of my invention may be more fully understood by direct reference to the drawing, wherein:

Fig. 1 is a schematic, diagrammatic and perspective view of one form of automatic switch embodying my invention, as applied to the quadrant axle of the steering gear of an automotive vehicle. In this figure the parts of the switch have been separated in an exaggerated manner in order to more fully show the operation of the device.

Fig. 2 is a schematic diagram showing the relative position of the two discs of the automatic switch shown in Fig. 1 when an increasing turn is being made to the left.

Fig. 3 is a schematic diagram similar to Fig. 2, showing the condition of the discs of the automatic switch shown in Fig. 1 after a left turn has been made and the turn is decreasing toward the straight-away path.

Fig. 4 is a graphic chart showing turn angles with relation to the points at which signals are on and off when a switch embodying my invention is utilized on a vehicle.

In Fig. 1, a vehicle steering gear 1, such as is used to steer an automotive vehicle, is provided with the usual steering column 2 and quadrant axle 3 to which quadrant arm 4 is attached, operating steering gear drag link 5. I prefer to mount the switch embodying my invention coaxially with the quadrant axle, and provide a switch axle 7 which may be attached in any convenient manner to quadrant axle 3. The extension of the switch axle is shown by dotted lines 8.

Mounted on the end of switch axle 7 is a sector disc 10 keyed to shaft 7 with key 11. On the periphery of sector disc 10, which is preferably of insulating material, is a left sector 12 and a right sector 14, each sector being conductive and preferably extending around more than 90° of arc to allow for the full steering angle. The two sectors 12 and 14, at one pair of adjacent ends, are spaced to provide a normal straight-away non-indicating angle, and I have found that this angle should be, for best operation of the device, from 10° to 15°, although when used in crowded urban territory the spacing may be even less.

A common brush 15 is positioned to bear against the periphery of sector disc 10, in such a position that when the vehicle steering gear 1 is alined to steer the vehicle in an exact straight-ahead course, common brush 15 will not touch either sector 12 or 14.

Also mounted on shaft 7 is an oscillating disc 20, this disc being free to rotate on shaft 7 over a limited arc, as determined by stop pin 21 which is within stop notch 22 on the periphery of oscillating disc 20.

Mounted on the periphery of oscillating disc 20 is a right contact segment 24 and a left contact segment 25. Bearing against the periphery of oscillating disc 20 is a right signal brush 26 and a left signal brush 27, and these brushes are positioned adjacent contact segments 24 and 25 and preferably on the same side thereof, so that as disc 20 oscillates, only one of the segments 24 or 25 can contact brushes 26 or 27 at one time, and they are so positioned with relation to stop notch 22 that when disc 20 has rotated to its full extent in one direction, one segment will make contact with one brush, and when disc 20 rotates to the full length of its permissible arc in the other direction, the other segment will make contact with the other brush. Oscillating disc 20 is frictionally rotated from shaft 7, and there may be, if desired, a special friction clutch provided for transmitting power directly from shaft 7, or, as shown, the frictional power for oscillating disc 20 may be supplied through left intermediate brush 30 and right intermediate brush 31, these brushes extending from contact segments 25 and 24 respectively, to contact and bear on sectors 12 and 14 on sector disc 10, preferably at the center of each segment, to allow rotation of the sector disc in both directions.

In the drawing, I have shown intermediate brushes 30 and 31 greatly elongated for clarity of illustration, inasmuch as, in a commercial example of the device, discs 20 and 10 would be mounted relatively close together on shaft 7, thus making intermediate brushes 30 and 31 of relatively short length.

Left signal brush 27 is connected to left signal lamp 40, and right signal brush 26 is connected to right signal lamp 41. Common brush 15, bearing against the sector disc 10, is connected to battery 42, the other end of which is grounded, as are both lamps, thus completing the circuits except for switch conditions.

The operation of the device to give differential illumination of the signal lamps 40 and 41 for a left turn is shown in Figs. 2 and 3.

Fig. 2 shows the effect of an increasing left turn. Here, as the vehicle steering gear is turned to the left, sector disc 10 will rotate, thus causing common brush 15 to ride on left sector 12. At the same time, oscillating disc 20 has been frictionally turned to the left to the limit of its possible rotation, as determined by the stop 21 and notch 22, and segment 25 has made contact with left signal brush 27. Thus, the circuit from battery 42 is completed to left signal lamp 40 through intermediate brush 30, and the left lamp is illuminated. If the left turn is maintained after the desired degree of turn is reached, signal lamp 40 will remain illuminated; if the left turn is increased, the lamp 40 will still be illuminated.

A different condition, however, results if the left turn is decreased, and this condition is shown in Fig. 3. Here, as the turn is decreased the direction of rotation of shaft 7 is reversed, and the first thing that happens is that oscillating disc 20 will rotate to the other end of its permissible arc before the connection of sector 12 and brush 15 is broken. Thus, the electrical connection between segment 25 and left signal brush 27 will be broken, even though common brush 15 is still in contact with left sector 12 on the sector disc. At the same time, the right signal lamp 41 cannot be illuminated because common brush 15 is out of contact with right sector 14. Thus, as long as the left turn is increased or maintained, the left signal light will be illuminated. However, whenever the left turn is decreased, no signal at all will be given by either lamp.

If the left turn is decreased but not to the no-signal angle including the straight-away path, as determined by the distance between adjacent ends of the sectors, and then again increased, the left light will again come on, due to the fact that oscillating disc 20 will return to the position shown in Fig. 2. Upon return to the straight-away path, no signal will be given by either lamp, because common brush 15 is not in contact with either sector 12 or 14. Upon turning to the right, the oscillating disc will have made its connection, and as soon as common brush 15 contacts right sector 14, the complete circuit will be established for right light 41, in exactly the same manner as has been described for a left turn. The shift on disc 20 may be made very fast by restraining oscillation thereof to a small angle.

Fig. 4 shows the complete turning cycle. Here, the no-signal angle 50, shown as being from 10° to 15°, includes the straight-away path designated by arrow 51. Whenever the vehicle is turned out of this no-signal angle, the light on that side of the vehicle will be illuminated. As long as the turn is increased to the left the signal will be on. Whenever the turn is decreasing, the signal will be off, irrespective of where the turn is reversed and whether or not the turn is of short radius or long radius outside of the no-signal angle.

I have therefore provided a switch which, in combination with right and left signaling circuits containing indicators, is a great improvement over the prior sector type switches, in that a signal will always be given when the turns are being increased or maintained, but which will give no signal when the turn is decreasing toward the straight-away no-signal path.

I claim:

1. In a vehicle direction indicator, means for automatically indicating the direction of turn-off from a stright-away path as long as the turn is continued or increased beyond a predetermined angle, said indicating means including visible left and right indicators and being operative irrespective of the degree of turn in either direction, exclusive of turns comprehended within said predetermined angle which contains the straight-away position, said first mentioned means including means automatically removing all indication from both of said visible indicating means whenever the angle of turn is reversed on the same side of said predetermined angle.

2. In combination with a vehicle steering mechanism, a pair of circuits each including a directional signal device, a power supply, means for maintaining said circuits open over a predetermined steering angle including the straight-away course, contact means for connecting one or the other of said circuits to said power supply in accordance with the direction of movement of said steering mechanism when said vehicle is turning beyond said predetermined angle, and means operating after the closure of one circuit to prevent energization of either circuit upon reversal of turn toward the straight-away and before said vehicle returns to a path within said predetermined angle.

3. In combination with a vehicle steering mechanism, a pair of circuits each including a directional signal device, a power supply, means for maintaining said circuits open over a predetermined steering angle including the straight-away course, contact means for connecting one or the other of said circuits to said power supply in accordance with the direction of movement of said steering mechanism when said vehicle is turning beyond said predetermined angle, and oscillating means actuated by a friction element driven by said steering mechanism for preventing energization of either circuit upon reversal of turn toward the straight-away and before said vehicle returns to a path within said predetermined angle.

4. In combination with a vehicle steering mechanism, a pair of circuits each including a directional signal device, a power supply, means for maintaining said circuits open over a predetermined steering angle including the straight-away course, contact means for connecting one or the other of said circuits to said power supply in accordance with the direction of movement of said steering mechanism when said vehicle is turning beyond said predetermined angle, a contact supporting device for opening any closed circuit upon reversal of turn toward the straight-away and before said vehicle returns to a path within said predetermined angle and for preventing energization of the other circuit until the predetermined angle has been traversed, stationary contacts in spaced relation to said contact supporting device and cooperating therewith to make and break said circuits as stated, and means for producing a frictional force operating on said contact supporting devices to cause said make and break in accordance with rotation of said steering mechanism.

5. In combination with a vehicle steering mechanism, a pair of circuits each including a directional signal device, a power supply, means for maintaining said circuits open over a predetermined steering angle including the straight-away course, contact means for connecting one or the other of said circuits to said power supply in accordance with the direction of movement of said steering mechanism when said vehicle is turning beyond said predetermined angle, said contact means being actuated by a reversal of turn to disconnect the connected signal device from said power supply and to prevent the connection of the other signal device during said reversal of turn on the same side of the straight-away course.

HERBERT E. METCALF.